3,392,049
METHOD FOR THE PRODUCTION OF SYNTHETIC PLASTIC VENEER
Viktor Bausch, Konigin-Luise Strasse 76a, Berlin, Germany, and Karl-Wilhelm Roeren, Berlin, Germany; said Roeren assignor to said Bausch
No Drawing. Continuation-in-part of application Ser. No. 260,054, Feb. 20, 1963. This application Jan. 19, 1967, Ser. No. 610,239
2 Claims. (Cl. 117—155)

ABSTRACT OF THE DISCLOSURE

Synthetic plastic veneers are manufactured from paper having a specific gravity of approximately 1 and air permeability of approximately 10 to 100 ml./min. by the Schopper method impregnated with a solution including a hardenable synthetic resin and an organic solvent with high capillary activity.

---

This application relates to an improved method for the production of synthetic plastic veneer and, more particularly, to intermediates for the production of such veneers which are flexible without being frangible.

This application is a continuation-in-part of our copending application Ser. No. 260,054, filed Feb. 20, 1963, and now abandoned.

Synthetic plastic veneers have been prepared utilizing absorbent white, colored or decoratively printed paper. This paper is impregnated with aqueous, alcoholic or aqueous-alcoholic solutions of a prepolymer or a precondensate of a synthetic resin, or of a mixture of hardenable synthetic resins. The impregnated papers may be treated under heat and pressure to drive off the water or alcohol at a temperature which is insufficient to fully polymerize or condense the resins. When the impregnated paper is in place, it may then be fully heated in a known way to complete the polymerization or condensation and in the course of so doing bond the veneer in place.

The prior art paper sheets have been used for covering a hard surface such as plywood sheets, chipboard sheets or hard fiber sheets for the furniture industry. If they are to be pressed the paper may be used directly after impregnation with a prepolymer or precondensate. Alternatively they may be used fully polymerized or condensed, the sheet then being fixed to the carrying surface in known fashion. In the latter form the sheets are customarily pressed together with a strong paper or fabric since without this carrier they cannot be manipulated due to their brittleness. These pressed sheets must be prepared in batch form rather than in long strips. Sheets in which the resin is still present as prepolymer or precondensate can be supplied in roll form but they are brittle and difficult to handle particularly after storage.

The paper utilized has been of an absorbent character with a loose fiber structure analogous to blotting paper. These papers are not or are only inconsequentially sized in the pulp and the fibers are freely and only slightly beaten. These papers are characterized by a high permeability to air of the order of 200 to 900 ml./min. according to the Schopper method. These prior art papers are also of low specific gravity since they have no substantial filler content. The specific gravity of these papers is about 0.5 to 0.7.

The loose fiber structure and high absorbency of these papers have been considered essential to obtain a satisfactory impregnation of the paper with the aqueous or alcoholic or combination aqueous-alcoholic solutions previously employed.

The foregoing factors have led to a high resin content of the impregnated paper. This may range from 70 to 100% of the weight of the paper and this high resin content is probably the reason for the brittleness and fragility of the impregnated paper. The high resin content has also made necessary the lining of the fully condensed or polymerized sheet as mentioned above.

In accordance with the present invention a less absorbent paper with a high specific gravity is employed and a resin solution in an organic solvent with high capillary activity is utilized. In this way a more flexible elastic and inexpensive impregnated sheet is secured, a smaller proportion of resin is required and the impregnated paper may be formed in large rolls or sheets which do not require the protective paper or fabric layers utilized by the prior art.

The paper utilized in carrying out the present invention has a denser fiber structure, a lower absorbency for water and a lower air permeability than the paper previously employed. The specific gravity of the paper per se (without the small proportion of filler) is about 1 and the air permeability by the Schopper method is preferably 10 to 50 ml./min. This air permeability may be a maximum of 100 ml./min. If the previously utilized papers may be compared to blotting papers the paper utilized by the present invention is similar to a smooth drawing paper. These papers may be colored in the pulp or may be printed with a desired pattern or wood graining.

The solution of resin, precondensate or prepolymer is prepared with an organic solvent having a high capillary activity. In this way the paper can be impregnated effectively whereas such impregnation would be difficult or substantially impossible with the aqueous or alcoholic solutions of such resins, prepolymers or precondensates of the prior art.

The hardenable resins employed are preferably aminoplasts, e.g. urea or melamine resins. These may have their brittleness decreased with an added proportion of alkyd resins in the known manner. Etherified melamine resins are particularly useful. The solvents employed are organic solvents of high capillary activity such as xylene and dioxane which may be utilized per se or in combination with other solvents.

The proportion of resin in the impregnated paper after evaporation of the solvent is only about 25–30% of the weight of the paper or about 20–25% of the weight of the finished sheet.

The impregnation of the paper with the resin solution or the solution of a precondensate or prepolymer of the resin is carried out in the customary manner. This can be done by drawing the papers through a trough filled with the solution and freeing the paper from excess resin solution with a pair of rollers. The solvent is then driven off in a drying duct and may be reused.

Because of the extraordinary capillary activity of the resin solutions of the present invention the impregnation of the paper may be carried out by applying a solution to one side of the paper by pouring it from a container thereon. By control of the drying (i.e. driving off the solvent) the resin solution may be permitted to diffuse into the paper so that an impregnation is secured almost to the reverse side but nevertheless the paper retains its fibrous paper character. The side to which the resin has been applied may be a sealed resin film as a result of the drying operation even though the remainder of the paper sheet retains its paper characteristics and the other side is sticky.

By the utilization of the method of the present invention resin solutions can be employed in which pigments are incorporated in the known manner. These pigments can be made to lie on the surface of the paper which act similar to a filter with the major proportion of the resin solution diffused into the paper and pigmenting it. In this manner colored or white sheets may be prepared having a varnished type surface.

Where the paper is comparatively thick, the operation can be carried out in two stages with the first stage utilizing a resin containing solution without pigment and the second stage utilizing an additional coating with pigmented resin.

As is known the aminoplasts harden in the cold upon the addition of acid hardening agents such as hydrochloric acid, p-toluene sulfonic acid, oxalic acid, as well as upon heating. The amount of acid employed is preferably ½ to 3% of weight of the solid aminoplasts and the proportion is determined depending upon whether the sheet is pressed at high temperature and/or high pressure in the veneer press upon an underlying carrier or whether it is adhered to the carrier in a cold press at low temperatures. Where low temperatures are employed the high proportion of acid is utilized.

What is claimed is:

1. A method for manufacturing a synthetic plastic veneer comprising impregnating paper having a specific gravity of approximately 1 and a permeability to air of approximately 10 to 100 ml./min. with a solution including a hardenable synthetic resin and an organic solvent with high capillary activity and removing the solvent to thereby form an impregnated paper having a resin content of approximately 25–30% of the weight of the paper.

2. A method according to claim 1 in which the resin is of the aminoplast group.

References Cited

UNITED STATES PATENTS

| | | | |
|---|---|---|---|
| 1,236,460 | 8/1917 | McIntosh | 117—153 |
| 1,418,891 | 6/1922 | Taylor | 161—264 |
| 2,075,328 | 3/1937 | Albert | 117—153 |
| 2,609,321 | 9/1952 | Patterson | 117—155 |
| 2,740,728 | 4/1956 | Sonnabond et al. | 117—155 X |
| 2,930,727 | 3/1960 | Baranyi | 161—263 X |
| 2,964,426 | 12/1960 | Holtschmidt | 161—263 X |
| 3,200,008 | 8/1965 | Holtschmidt et al. | 161—263 X |

FOREIGN PATENTS

| | | |
|---|---|---|
| 316,700 | 8/1929 | Great Britain. |
| 227,008 | 2/1960 | Australia. |

OTHER REFERENCES

Chemical Abstracts, volume 45: 6841, 1951.

WILLIAM D. MARTIN, *Primary Examiner.*

M. R. LUSIGNAN, *Assistant Examiner.*